(12) United States Patent
Ransom et al.

(10) Patent No.: US 8,775,817 B2
(45) Date of Patent: Jul. 8, 2014

(54) APPLICATION-CONFIGURABLE DISTRIBUTED HASH TABLE FRAMEWORK

(75) Inventors: Kevin Ransom, Duvall, WA (US); Brian Lieuallen, Redmond, WA (US); Yu-Shun Wang, Bellevue, WA (US); Scott Briggs, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1136 days.

(21) Appl. No.: 12/118,753

(22) Filed: May 12, 2008

(65) Prior Publication Data

US 2009/0282048 A1 Nov. 12, 2009

(51) Int. Cl.
*H04L 29/06* (2006.01)

(52) U.S. Cl.
USPC ............................. 713/179; 709/238; 370/238

(58) Field of Classification Search
USPC .......... 726/4, 7; 709/225, 223, 206, 228, 238; 370/260, 352, 401
See application file for complete search history.

(56) References Cited

U.S. PATENT DOCUMENTS

| | | | |
|---|---|---|---|
| 5,941,955 A * | 8/1999 | Wilby et al. | 709/242 |
| 6,999,454 B1 | 2/2006 | Crump | |
| 7,206,934 B2 | 4/2007 | Pabla et al. | |
| 7,313,565 B2 | 12/2007 | Zhang et al. | |
| 7,684,352 B2 * | 3/2010 | Smith et al. | 370/255 |
| 2005/0223102 A1 | 10/2005 | Zhang et al. | |
| 2006/0153082 A1 * | 7/2006 | Lee et al. | 370/238 |
| 2006/0191020 A1 * | 8/2006 | Miller | 726/28 |
| 2006/0221930 A1 | 10/2006 | Sweeney et al. | |
| 2006/0253606 A1 * | 11/2006 | Okuno | 709/238 |
| 2007/0002869 A1 | 1/2007 | Miller | |
| 2007/0055555 A1 | 3/2007 | Baggett et al. | |
| 2007/0156899 A1 * | 7/2007 | Yoon et al. | 709/225 |
| 2007/0250700 A1 | 10/2007 | Sidhu et al. | |
| 2008/0016240 A1 * | 1/2008 | Balandin | 709/238 |
| 2008/0070543 A1 * | 3/2008 | Matuszewski et al. | 455/404.1 |
| 2009/0064300 A1 * | 3/2009 | Bagepalli et al. | 726/7 |
| 2009/0125637 A1 * | 5/2009 | Matuszewski | 709/238 |

FOREIGN PATENT DOCUMENTS

AU WO2008040092 * 4/2008

OTHER PUBLICATIONS

Wolfl, "Public-Key-Infrastructure Based on a Peer-to-Peer Network", 2005, IEEE, p. 1-10.*
Manku, "Routing Networks for Distributed Hash Tables", In Proceedings of the 22nd ACM Symposium on Principles of Distributed Computing, 2003, pp. 10.
Sit, et al., "Security Considerations for Peer-to-Peer Distributed Hash Tables", The International workshop on Peer-To-Peer Systems (IPTPS), 2002, pp. 1-6.
Tamassia, et al., "Efficient Content Authentication in Peer-to-Peer Networks", vol. 4521, Springer Berlin / Heidelberg, 2007, pp. 1-19.
Cai, et al., "A Peer-to-Peer Replica Location Service Based on a Distributed Hash Table", In Proceedings of the SuperComputing, 2004, IEEE, pp. 12.

* cited by examiner

*Primary Examiner* — Mahfazur Rahman
*Assistant Examiner* — Gregory Lane
(74) *Attorney, Agent, or Firm* — John Jardine; Andrew Sanders; Micky Minhas

(57) ABSTRACT

A distributed hash table infrastructure is described that supports pluggable modules for various services. Transport providers, security providers, and other service providers may be swapped, providing flexibility in supporting various devices and networking configurations.

20 Claims, 5 Drawing Sheets

APPLICATION-CONFIGURABLE DISTRIBUTED HASH TABLE FRAMEWORK

BACKGROUND

A hash table defines a mapping relationship between keys and their associated values. A Distributed Hash Table (DHT) implements the functionality of a hash table in a distributed fashion, providing a remote lookup service from any participating node in the DHT to retrieve the value associated with a given key. DHTs are used to provide services, including distributed file systems, peer-to-peer file sharing, cooperative web caching, multicast, domain name services, and instant messaging, for example.

DHT can implement large-scale resource indexing and discovery services, as well as distributed file systems. An application example is to use DHT in a distributed content lookup and retrieval system to store the network addresses of contents, indexed by the hash of the contents. Or the DHT can be used to store the contents directly, depending on the implementation.

DHT is the foundation of many Peer-to-peer network applications that emphasize the characteristics of decentralization, scalability, and fault tolerance. The semantic-free nature of the key-value mappings allows applications on top of DHT to define arbitrary relationship between keys (index) and values (data). It also decouples the actual locations from any existing structure of the contents and services. This property makes it possible to achieve load-balancing and avoid centralization even for services with hierarchical architecture.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In accordance with one implementation presented herein, a distributed hash table may be used to store in a distributed manner identified by numeric keys, with application-configurable (pluggable) modules, such as bootstrapping mechanisms, transports, storage or secure routing protocol mechanisms. This allows, for example, a hash table to be distributed across disparate nodes, allowing each node to have appropriate security and transport modules for its own operating environment. Distributed hash tables may be built using the Distributed Routing Tables (DRT) key-based routing infrastructure, which identifies the node which manages the storage of a data item based on its key.

Nodes may exist on various types of devices by providing techniques to permit "plugging in" appropriate service providers, such as security or storage modules for each device. For example, on some devices, it may be desired to store hash table key-value pairs in memory, while on other devices, on-disk may be a preferred format. For another example, a security module for a handheld computer may differ from one for a server.

Many of the attendant features will be more readily appreciated as the same becomes better understood by reference to the following detailed description considered in connection with the accompanying drawings.

DESCRIPTION OF THE DRAWINGS

The detailed description provided below in connection with the appended drawings is intended as a description of example implementations and is not intended to represent the only forms in which an application-configurable distributed hash table framework may be constructed or utilized. The description sets forth the functions of example implementations and the sequence of steps for constructing and operating the examples. However, the same or equivalent functions and sequences may be accomplished by alternate implementations.

The present description will be better understood from the following detailed description read in light of the accompanying drawings, wherein.

DETAILED DESCRIPTION

Figure 1:
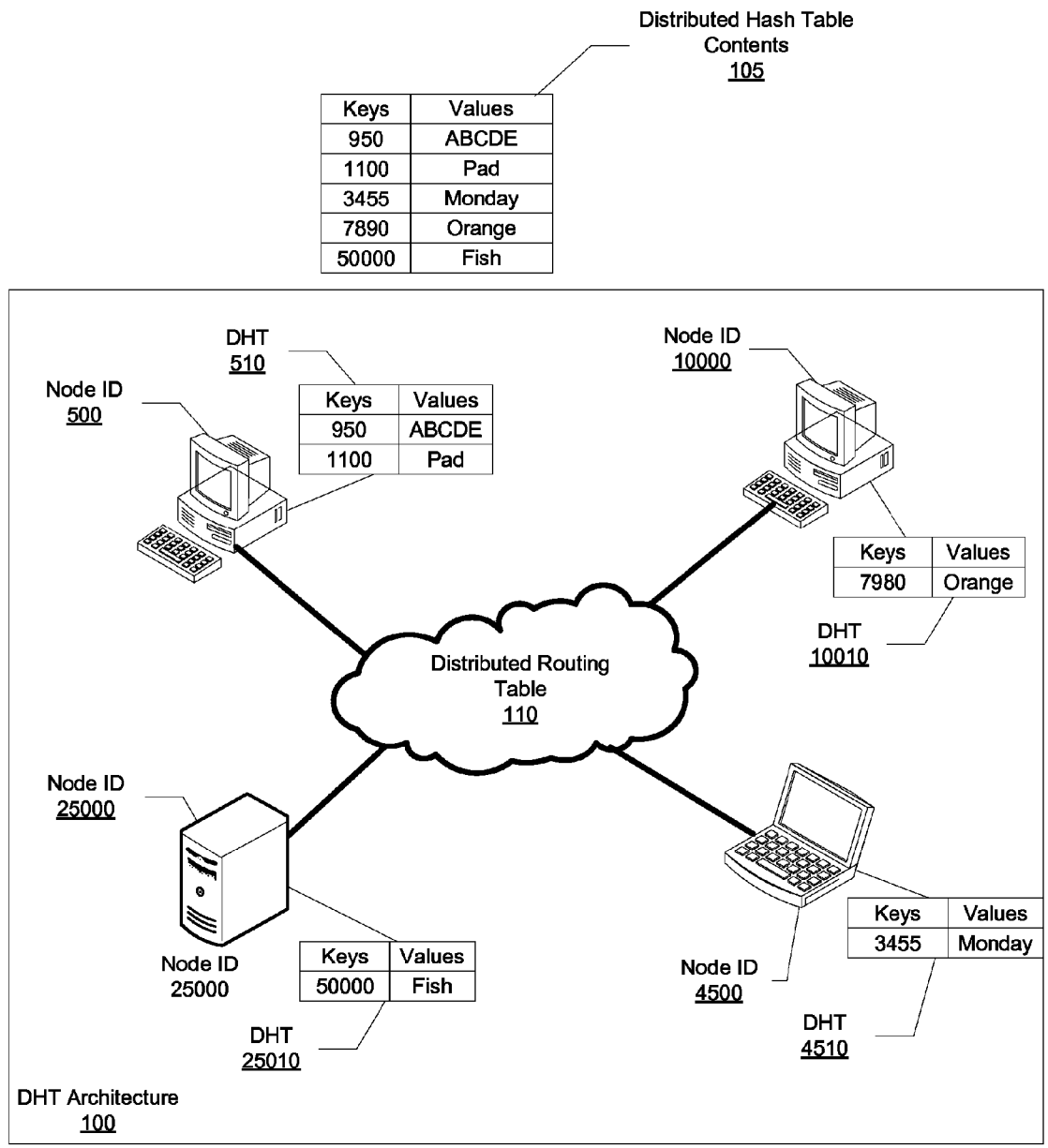
FIG. 1 is a block diagram of an example operating environment in which an application-configurable distributed hash table framework may be implemented.

Described herein are, among other things, examples of various technologies and techniques that allow an application-configurable distributed hash table framework. Although the examples are described and illustrated herein as being implemented in a personal computer system, the system described is provided as an example and not a limitation. As those skilled in the art will appreciate, the present examples are suitable for application in a variety of different types of systems.

In the figures, like reference numerals are used throughout several drawings to refer to similar components.

A hash table defines a mapping relationship between keys and their associated values. A DHT implements the hash table functionality in a distributed fashion, providing a remote lookup service from any participating node in the DHT to retrieve the value associated with a given key. FIG. 1 shows an example of a conceptual system architecture diagram 100 of a DHT. A DHT consists of a set of nodes; each stores a part of the overall hash table, and a forwarding table (not shown) of other nodes to find the remaining part of the hash table. The forwarding tables collectively determine the topology (also called a mesh or overlay) of the DHT, and in this example is a form of Key-Based Routing (KBR) as opposed to the traditional address-based routing in the Internet. In this example, the contents of hash table 100 are shown, with keys and values. Distributed hash table 105 is distributed across 510, 4510, 10010, and 25010 stored on nodes 500, 4500, 10000, and 25000 respectively. In this example, the distribution is implemented on distributed routing table 110 and is based on node IDs, so that the key/value pairs are each stored on the node id closest numerically to the key. Keys 950 and 1100 are stored with their corresponding values on the node with ID 500 because they are numerically closer to 500 than to 4500, 10000, or 25000. In other implementations, other techniques for determining which node would store each key/value pair may be used. One skilled in the art will recognize that IP address, MAC address, geographical location, user name, or any number or combination of different factors may be used.

The management interface of a DHT allows users and applications to insert or delete nodes, and to update the table by adding, removing, or changing the key-value pairs. Any operation on a record in the DHT can be divided into two phases. The first phase is to locate the root node of the key value through the underlying Key-Based Routing or the overlay protocol, DRT in this example. After the root node is found, the second phase is to contact the root node of the record to perform the designated operation on the record. The root node lookup operation is performed within the DRT.

The querying node (the initiator) will consult its own DRT forwarding table, obtain the next closest node to a given key, and send the root node query to the next node. The next node will in turn look up its own DRT forwarding table, and reply the query with the next closest node in the key space to the key of the query. The initiator then repeats the querying process iteratively until the root node of the key is reached. This lookup process can also be done recursively where each intermediate node queries its next closest node before replying, or in a hop-by-hop fashion where each intermediate node forwards the query to the next closet node. The specifics of the lookup operations depend on the overlay technology.

Figure 2:
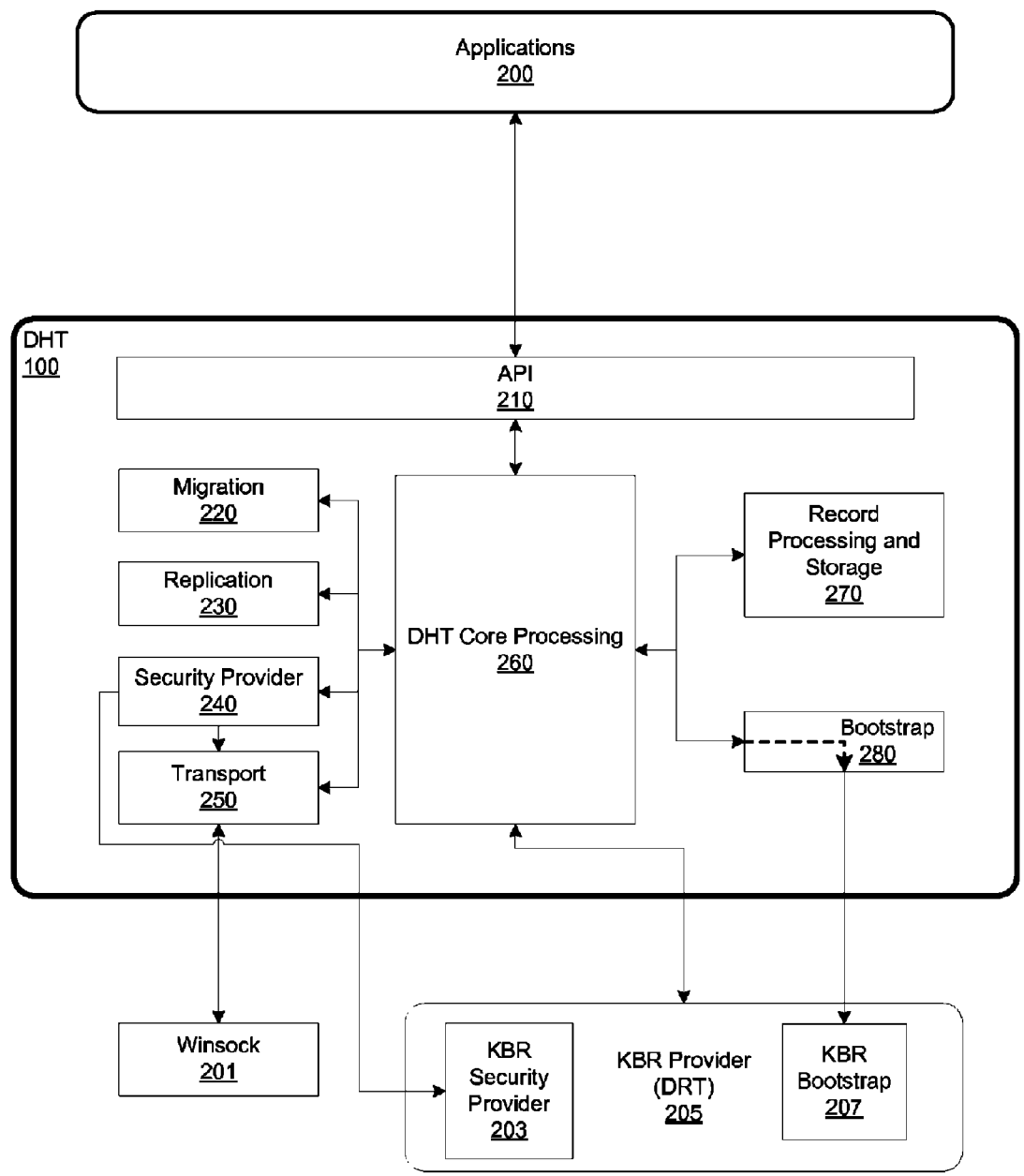
FIG. 2 is a block diagram providing additional detail for an example of an implementation of an application-configurable distributed hash table framework.

FIG. 2 is a block diagram providing additional detail for an example of an implementation of an application-configurable distributed hash table framework.

Applications 200 communicate with DHT 100 via an application programming interface (API) 210. API 210 provides the interface to add, get, or remove data from DHT 100. DHT core processing 260 provides the functionality, using various components such as migration 220, replication 230, security provider 240, transport 250, record processing and storage 270, bootstrap 280, and a key-based routing provider 205. Each of these components rely on other components; transport 250 uses Winsock 201, security provider 240 interacts with KBR security provider 203, and bootstrap 280 depends on KBR bootstrap 207.

In this example, certain components are configurable (pluggable) by a management application. This DHT 100 will provide a pluggable interface to storage provider 270 that provides the hash table key and value data storage. A pluggable security module 240 (providers/protocols) for the DHT is also provided for. Other core components include bootstrap 280 and migration mechanisms 220 to handle node join and leave, a (tunable) replication policy module 220 to increase fault tolerance at the DHT layer, and provisioning for record integrity protection. Each of these components is pluggable, allowing for the most appropriate technology for the specific node, the nature of the DHT, or any other relevant factors.

Transport provider 250 implements a message transport service for DHT and determines the transport protocol used in communication between DHT nodes. By way of example, but not limitation, transport providers include TCP or UDP over IPv6, HTTP- or RPC-based transports. One skilled in the art will recognize that other types of transport provider may be used as well. The applications, services, or system administrators using the DHT may provision the IPsec or firewall policies if required. The security in transport provider 250 may be independent from the Security provider of the DHT.

Transport provider 250 is a pluggable component in the DHT architecture, and may be replaced by another transport provider with different features.

Replication module 230 is used to provide copies of key-value pairs across multiple nodes. A root node in DHT can replicate its local hash records to a set of nodes for both backup and performance enhancement such that one of the neighboring nodes can answer for the root node if necessary. The set of close neighboring nodes is usually the leaf set of the root node, but can also be defined by some other metrics such as the closest N number of nodes, if the underlying routing system does not support the notion of leaf set. Although the leaf set selection policy for replication will affect the resulting traffic needed to move and synchronize the data and degree of reliability measure.

Security provider 240 authenticates and authorizes whether a node can join an existing DHT, and whether it can perform DHT operations on the records stored in the DHT. For example, security provider 240 may restrict operations that may be performed on the DHT, such as looking up or storing data. Security provider 240 may optionally authenticate and/or encrypt the content (value or data portion of a record) to provide integrity and confidentiality services. Examples of security provider functionality include some forms of password authentication, PKI-based certificate authentication, etc. Security provider 240 and the corresponding security credentials (e.g., passwords, certificates, etc.) of the DHT are provisioned by the application 200, and will be used in both the DHT and DRT.

Record processing and storage module 270 defines the operational semantics for processing and storing DHT records. It also allocates and manages record storage for the local hash table. Record processing and storage provider 270 is a pluggable module in the design. The pluggable nature of the various modules is illustrated in FIG. 3.

Figure 3:
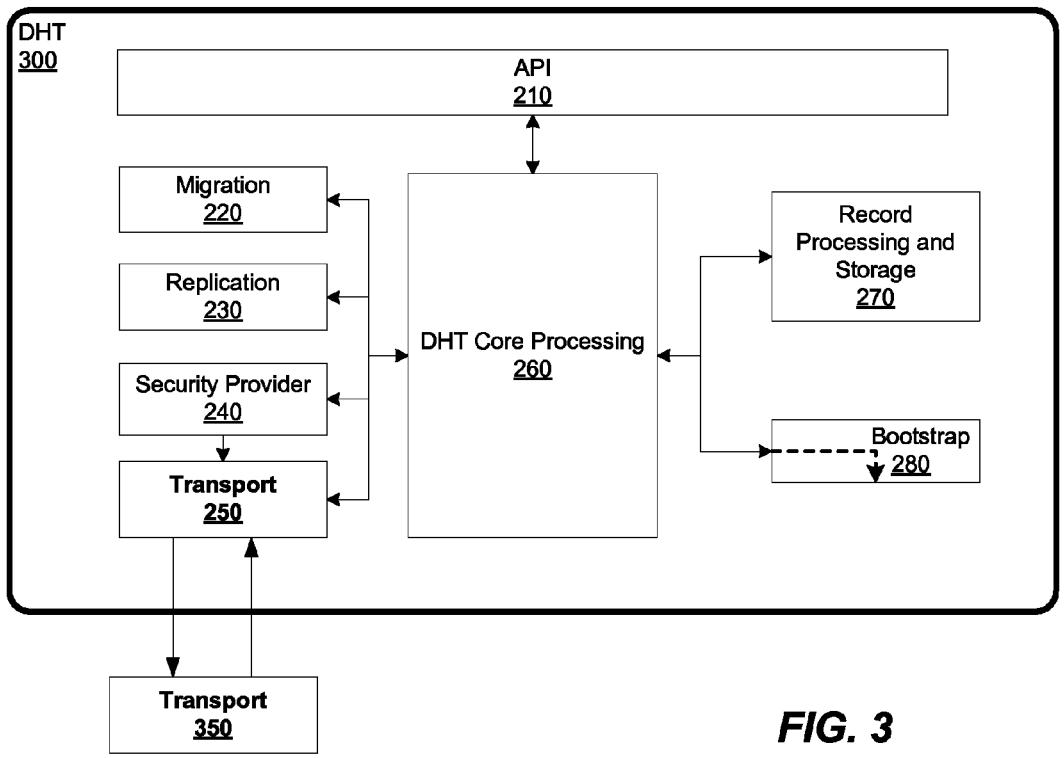
FIG. 3 is a block diagram providing additional detail for an example of an implementation of an application-configurable distributed hash table framework.

FIG. 3 shows an example DHT 300, with a transport provider module 250. Various situations may make it useful to replace transport provider module 250 with transport provider module 350, such as a change in network configuration, a desire to improve compatibility with additional devices, or any number of other conditions. In this example, a call has been received by API 210, with a request that the transport provider module 350 be used. As a result, transport provider module 250 is removed and module 350 replaces it.

Figure 4:
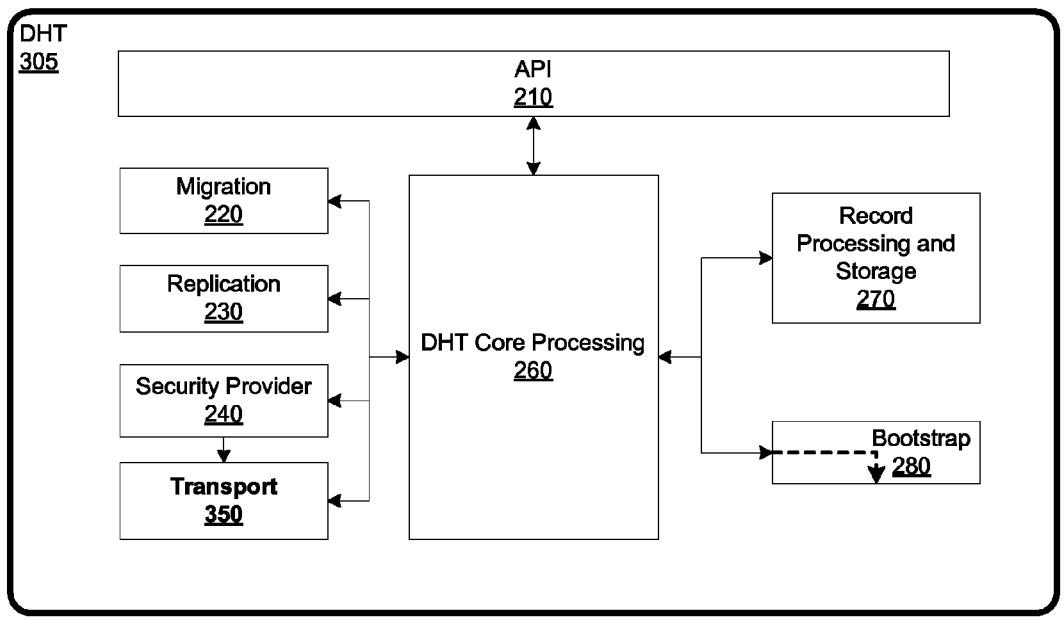
FIG. 4 is a block diagram providing additional detail for an example of an implementation of an application-configurable distributed hash table framework.

FIG. 4 shows a DHT 305, which is similar to DHT 300 except that Transport provider module 250 has been replaced by transport provider module 350, showing completion of the steps begun in FIG. 3.

Figure 5:
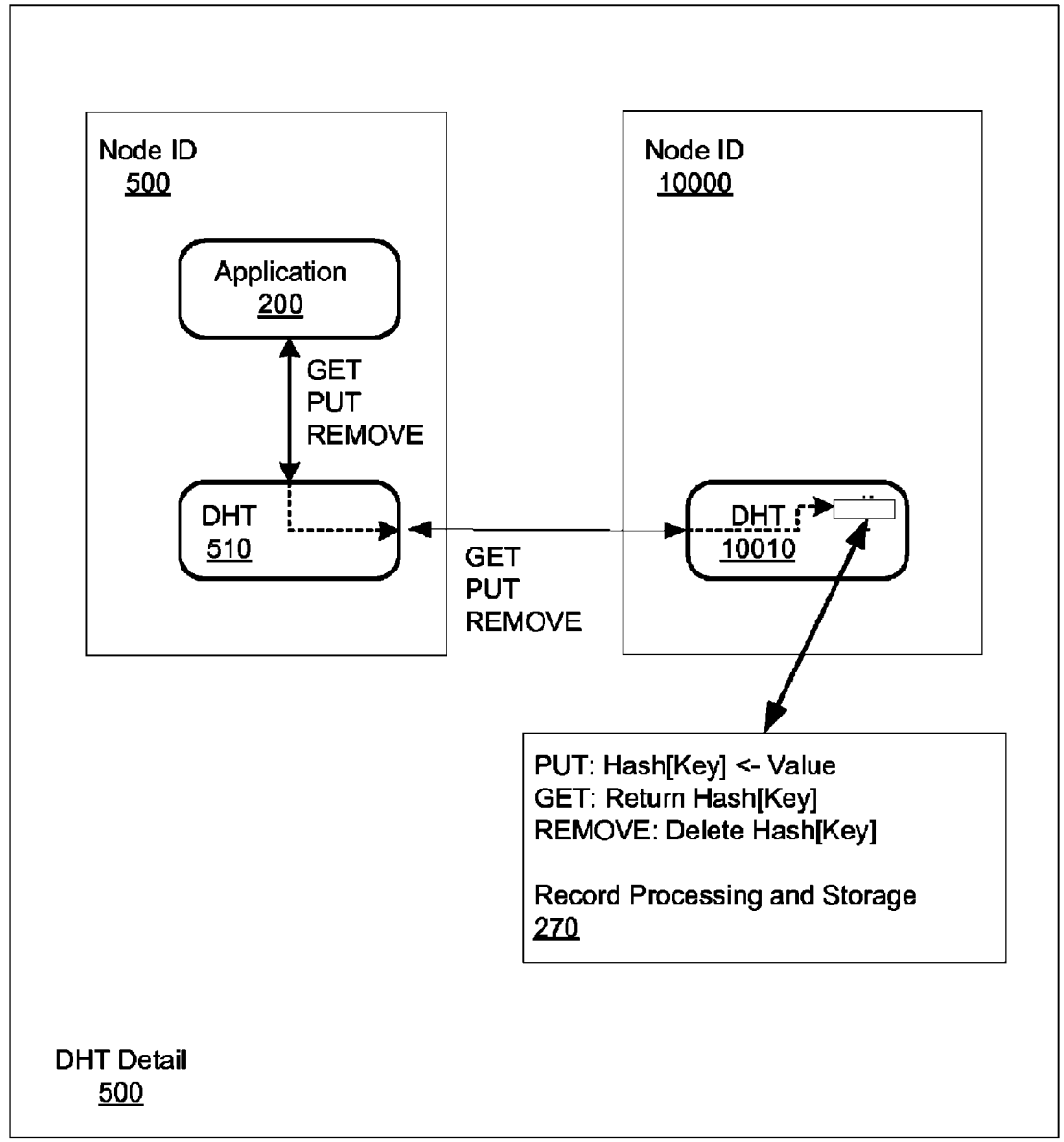
FIG. 5 shows an example flow diagram between nodes in an application-configurable distributed hash table.

FIG. 5 shows an example data flow between the applications 200 from FIG. 2, the DHT on the client side node 500, and the record processing and storage 270 at the root node DHT 10000 in example DHT detail 500. In this example, application 200 passes commands, such as GET, PUT, or REMOVE to DHT 510. The key associated with the command is found in DHT 10010 on Node ID 10000. DHT 510 passes the command to DHT 10010, where processing and storage module 270 implements simple hash table semantics, with each record entry being a (Key, Value) tuple. The DHT maintains the mapping relationship between the keys to their corresponding values. Subsequent updates (PUT) to the same key result in overwriting the value. Complex semantics, such as mapping each key to a list (or set) of values can be implemented by plugging in a custom processing and storage module. The processing and storage module 270 may determine whether the local hash table is stored in system memory, local file systems, or remote file systems.

Figure 6:
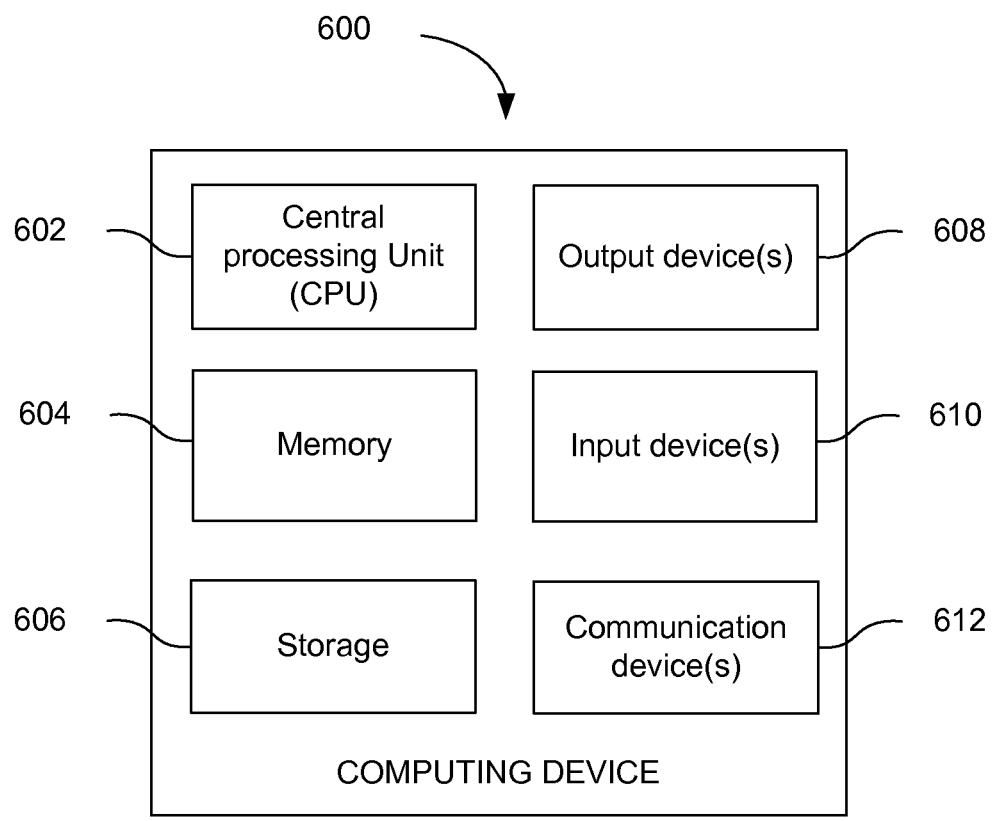
FIG. 6 illustrates a component diagram of a computing device for implementing one or more embodiments.

FIG. 6 illustrates a component diagram of a computing device according to one embodiment. The computing device 600 can be utilized to implement one or more computing devices, computer processes, or software modules described herein. In one example, the computing device 600 can be utilized to process calculations, execute instructions, receive and transmit digital signals. In another example, the computing device 600 can be utilized to process calculations, execute instructions, receive and transmit digital signals, receive and transmit search queries, and hypertext, compile computer code, as required by the consumer computing device 106, the merchant computing device 108, the merchant computing device 114, the listing web service 202, the web server 204, and the search engine 206.

The computing device 600 can be any general or special purpose computer now known or to become known capable of performing the steps and/or performing the functions described herein, either in software, hardware, firmware, or a combination thereof.

In its most basic configuration, computing device 600 typically includes at least one central processing unit (CPU) 602 and memory 604. Depending on the exact configuration and type of computing device, memory 604 may be volatile (such as RAM), non-volatile (such as ROM, flash memory, etc.) or some combination of the two. Additionally, computing device 600 may also have additional features/functionality. For example, computing device 600 may include multiple CPU's. The described methods may be executed in any manner by any processing unit in computing device 600. For example, the described process may be executed by both multiple CPU's in parallel.

Computing device 600 may also include additional storage (removable and/or non-removable) including, but not limited to, magnetic or optical disks or tape. Such additional storage is illustrated in FIG. 6 by storage 206. Computer storage media includes volatile and nonvolatile, removable and non-removable media implemented in any method or technology for storage of information such as computer readable instructions, data structures, program modules or other data. Memory 604 and storage 606 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 600. Any such computer storage media may be part of computing device 600.

Computing device 600 may also contain communications device(s) 612 that allow the device to communicate with other devices. Communications device(s) 612 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 600 may also have input device(s) 610 such as keyboard, mouse, pen, voice input device, touch input device, etc. Output device(s) 608 such as a display, speakers, printer, etc. may also be included. All these devices are well known in the art and need not be discussed at length.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A method for storing key/value pairs of a distributed hash table comprising:
   authorizing a node to join a distributed hash table based upon a PKI-based certificate, the distributed hash table associated with one or more components configured to at least one of:
      provide for a transport of communications;
      provide for bootstrapping using key-based routing bootstrapping;
      provide for migration and replication; or
      provide for processing and storage;
   determining that the node, within a plurality of nodes, comprises an identifier closest matching a key of a key/value pair, the identifier corresponding to at least one of:
      a node ID;
      an IP address;
      a MAC address;
      a geographical location; or
      a user name; and
   storing the key/value pair within a portion of the distributed hash table at the node.

2. The method of claim 1, the distributed hash table associated with an application.

3. The method of claim 1, comprising:
   implementing a key-based routing mechanism comprising one or more portions of a distributed routing table stored at one or more nodes to facilitate data communication amongst the plurality of nodes.

4. The method of claim 3, the implementing comprising:
   for respective nodes within the plurality of nodes:
   storing a portion of the distributed routing table at a node.

5. The method of claim 1, the one or more components comprising one or more pluggable components configured to:
   provide for the transport of communications;
   provide for bootstrapping using key-based routing bootstrapping;
   provide for migration and replication; and
   provide for processing and storage.

6. The method of claim 3, comprising:
   facilitating routing of a request from an initiator node to a target node, the request identifying a target key, the target node comprising a target key/value pair stored within a target portion of the distributed hash table stored at the target node, the target key/value pair comprising the target key.

7. The method of claim 6, the facilitating comprising:
determining within an initiator portion of the distributed routing table stored at the initiator node that a first node is associated with a first identifier closest matching the target key;
routing the request to the first node;
receiving a response from the first node, the response comprising a second identifier of a second node closest matching the target key within a second portion of the distributed routing table stored at the second node; and
routing the request to the second node.

8. The method of claim 7, comprising:
routing the request to one or more additional nodes associated with additional identifiers closest matching the target key within additional portions of the distributed routing table until the request is routed to the target node.

9. The method of claim 1, the key of the key/value pair numerically closer to the identifier of the node than one or more other identifiers associated with one or more other nodes comprised in the plurality of nodes.

10. A tangible computer readable storage device comprising computer executable instruction that when executed via a processing unit perform a method for routing a request based upon key-based routing, the method comprising:
receiving a request from an initiator node that is to be routed to a target node, the request identifying a target key comprised within a target key/value pair stored within a target portion of a distributed hash table stored at the target node;
authenticating at least one of the request or the initiator node based upon a PKI-based certificate;
determining within an initiator portion of a distributed routing table stored at the initiator node that a first node is associated with a first identifier closest matching the target key;
routing the request to the first node;
receiving a response from the first node, the response comprising a second identifier of a second node closest matching the target key within a second portion of the distributed routing table stored at the second node;
authenticating at least one of the response or the first node based upon a second PKI-based certificate; and
routing the request to the second node, at least one of the first identifier or the second identifier corresponding to at least one of:
a node ID;
an IP address;
a MAC address;
a geographical location; or
a user name.

11. The tangible computer readable storage device of claim 10, the method comprising:
routing the request to one or more additional nodes associated with additional identifiers closest matching the target key within additional portions of the distributed routing table until the request is routed to the target node.

12. The tangible computer readable storage device of claim 10, the distributed hash table associated with an application.

13. The tangible computer readable storage device of claim 10, the method comprising:
receiving data associated with a target value of the target key/value pair stored within the target portion of the distributed hash table.

14. The tangible computer readable storage device of claim 10, the method comprising:
performing an operation upon the target key/value pair stored within the target portion of the distributed hash table, the operation corresponding to at least one of: an insert node operation, a delete node operation, an add key/value pair operation, a remove key/value pair operation, or a change key/value pair operation.

15. The tangible computer readable storage device of claim 10, the method comprising:
replicating key/value pairs within a portion of the distributed hash table stored at a node to one or more backup nodes.

16. A system for routing a request based upon key-based routing, comprising:
a key-based routing provider configured to:
authorize at least one of an initiator node, a target node, a first node, or a second node to join a distributed hash table based upon a PKI-based certificate;
receive a request from the initiator node that is to be routed to the target node, the request identifying a target key comprised within a target key/value pair stored within a target portion of the distributed hash table stored at the target node;
determine within an initiator portion of a distributed routing table stored at the initiator node that the first node is associated with a first identifier closest matching the target key, the first identifier not matching the target key;
route the request to the first node;
receive a response from the first node, the response comprising a second identifier of the second node closest matching the target key within a second portion of the distributed routing table stored at the second node; and
route the request to the second node, the initiator portion of the distributed routing table not comprising the second identifier of the second node, at least one of the first identifier or the second identifier corresponding to at least one of:
a node ID;
an IP address;
a MAC address;
a geographical location; or
a user name.

17. The system of claim 16, the key-based routing provider configured to:
route the request to one or more additional nodes associated with additional identifiers closest matching the target key within additional portions of the distributed routing table until the request is routed to the target node.

18. The system of claim 16, comprising:
a record processing and storage module configured to:
perform an operation upon the target key/value pair stored within the target portion of the distributed hash table, the operation corresponding to at least one of: an insert node operation, a delete node operation, an add key/value pair operation, a remove key/value pair operation, or a change key/value pair operation.

19. The system of claim 16, comprising:
a replication module configured to:
replicate key/value pairs within a portion of the distributed hash table stored at a node to one or more backup nodes.

20. The system of claim 16, the second identifier closer to matching the target key than the first identifier.

* * * * *